July 26, 1927.
A. VILA
1,636,930
CLAMP FOR SCAFFOLDS
Filed Oct. 14, 1926
4 Sheets-Sheet 2
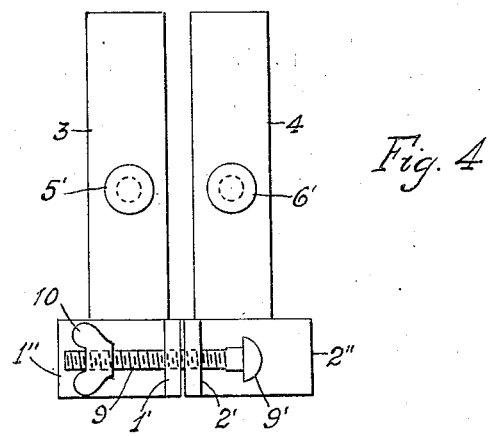
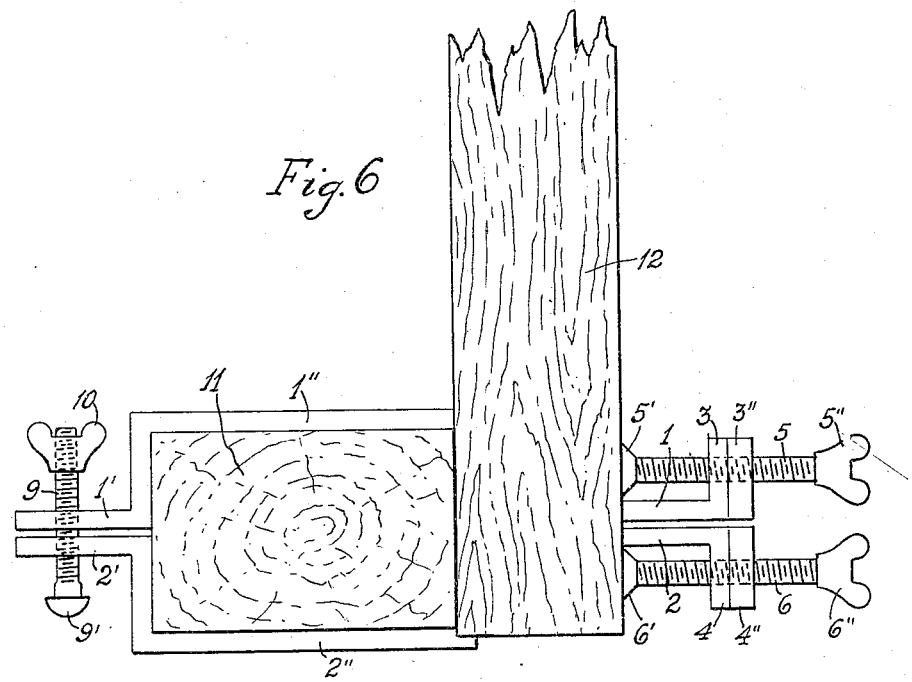
INVENTOR.
Alfonso Vila
BY B. Singer
ATTORNEY.

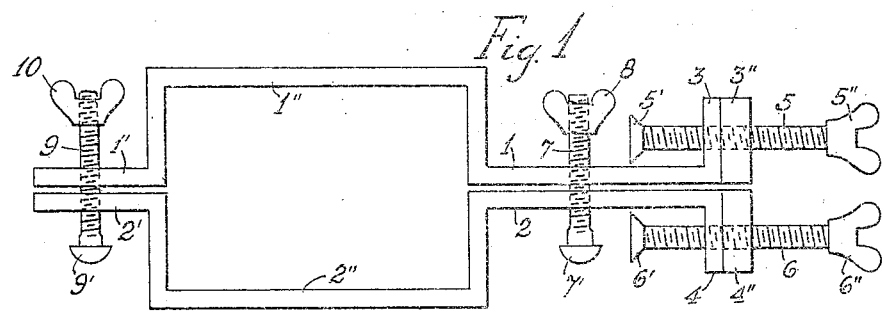
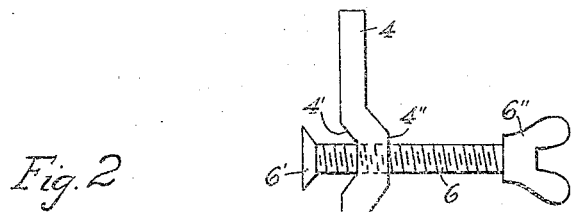
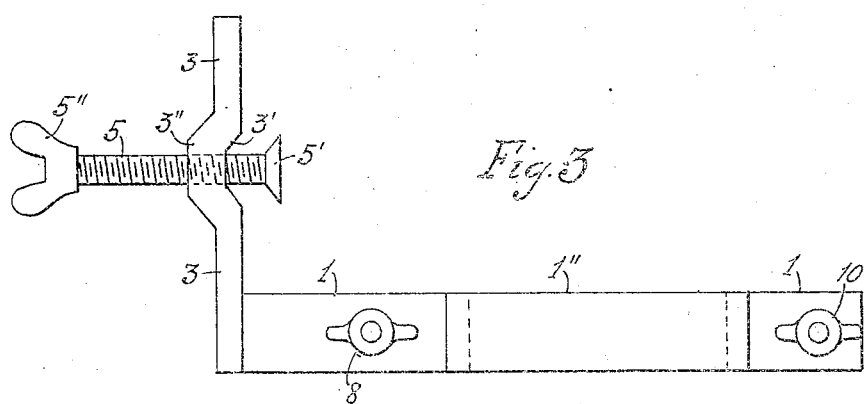

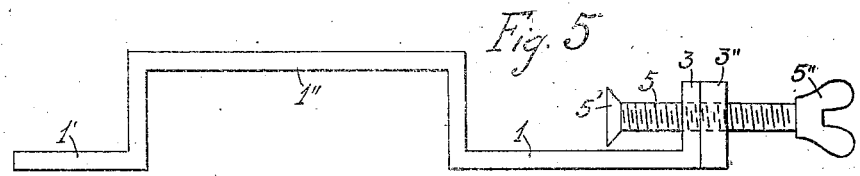
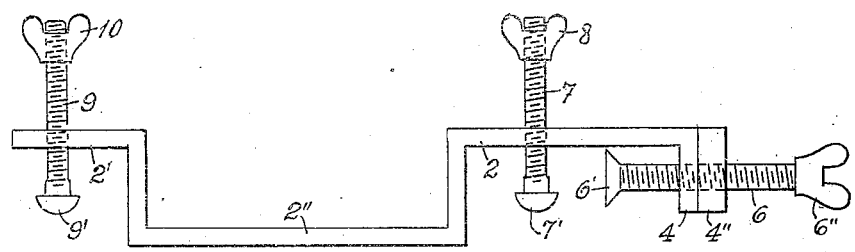
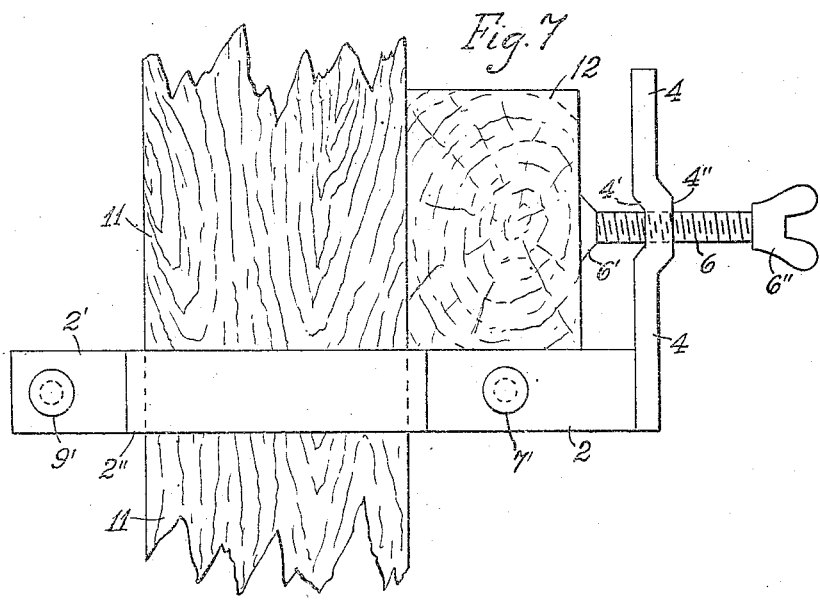

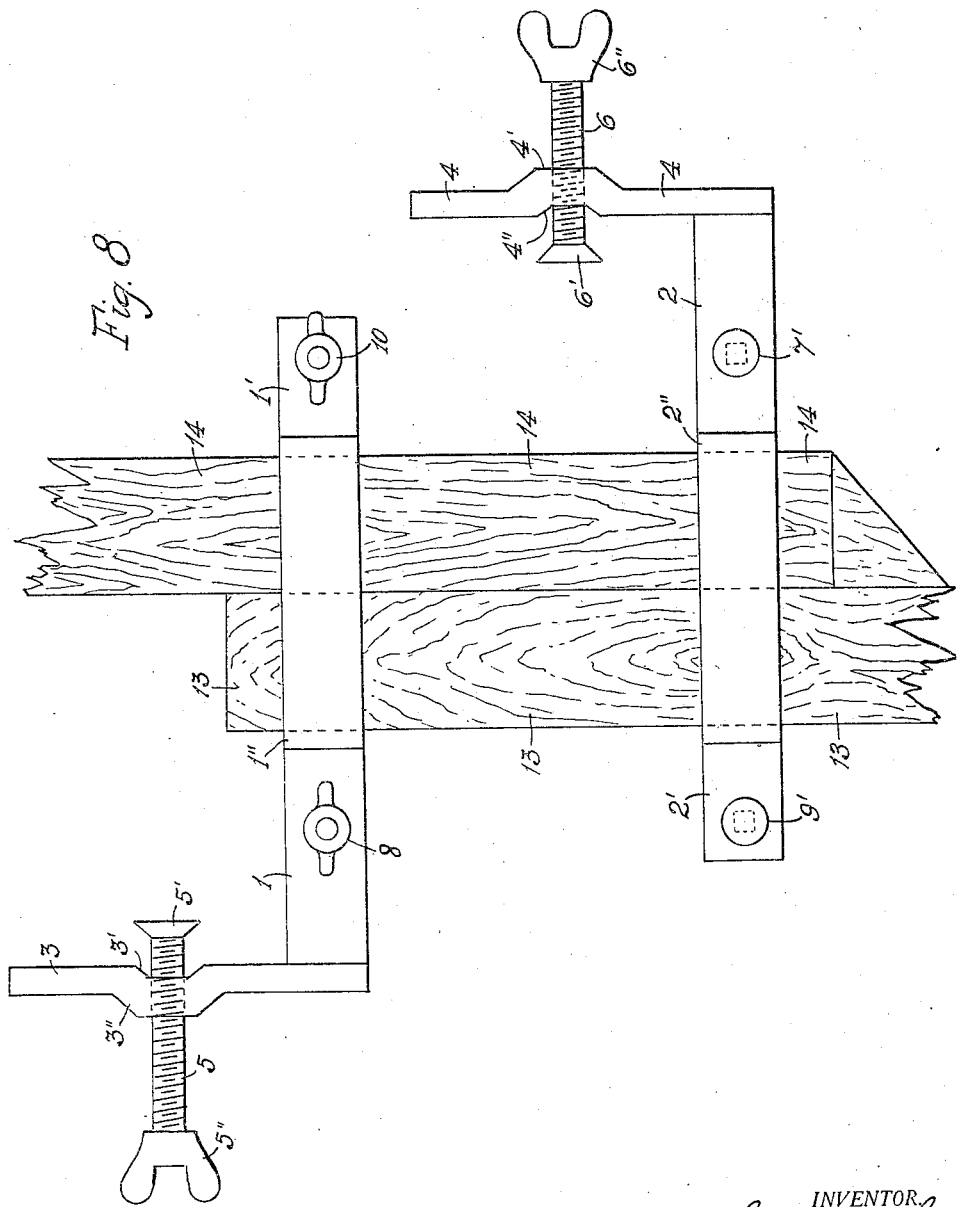

Patented July 26, 1927.

1,636,930

UNITED STATES PATENT OFFICE.

ALFONSO VILA, OF GUANABACOA, CUBA.

CLAMP FOR SCAFFOLDS.

Application filed October 14, 1926. Serial No. 141,625.

This invention refers to clamps for scaffolds and its object is to provide a new clamping device offering a maximum of safety in the fastening of timbers that constitute the scaffolds used in the erection of buildings, thus suppressing the troubles and danger heretofore encountered in the use of ropes, nails, etc.

Another object of the invention is to provide a clamp for scaffolds which will be of the greatest resistance and durability, and at the same time, easy to set up and take down.

And a further object of the invention is to provide a clamp for scaffolds that may be adapted to timbers of any thickness.

The invention is described with reference to the figures of the annexed drawings, in which:

Fig. 1 is an upper plan view of the clamp for scaffolds forming the subject matter of this invention.

Fig. 2 is a side elevation of same.

Fig. 3 is a side elevation of the clamp on the opposite side.

Fig. 4 is an end view of same.

Fig. 5 is a view similar to that of Fig. 1 showing the two halves or complementary sections of the clamp taken apart.

Fig. 6 is a horizontal of the clamp applied to the joint of an upright member and a bridge member or girder of a scaffold.

Fig. 7 is a side elevation of the same clamp and joint.

Fig. 8 shows in a side elevation, the joint of two upright members to which a couple of clamps is applied.

This clamp comprises two separate halves or complementary sections, these sections being vertical metallic plates, preferably of steel and of suitable thickness, each of which consists of a straight portion at each end, the straight portion 1 or 2 of an end being almost twice in length than the straight portion 1' or 2' of the other end, and the intermediate portion 1'' or 2'' of each plate is polygonally shaped, preferably U-shaped, these U-shaped portions opposing each other so as to leave between them, when placed adjacent to each other, an open rectangular space. Close to the end of each longer straight portion 1' or 2' of each plate is a flat projection 3 or 4 integrally annexed to same and vertically upset parallel with the square bent ends of each middle portion 1'' or 2'' of the above mentioned plates. The vertical flat portions 3 and 4 have approximately in the middle point of their length a thickened offset portion that forms on its inside face a groove 3' or 4' and on its outside face a projecting portion 3'' or 4'' with chamfered edges, there being a threaded bore through the thickened portion of each projection 3 and 4 for the threading respectively of a screw 5 or 6 which on its inner end terminates in a tapered head 5' or 6' and on its outer end has a double wing or butterfly head 5'' or 6''.

The longer straight portions 1 and 2 of said plates have holes registering in a transverse line, through which may be loosely mounted a screw 7 that has on one end a rounded head 7' and on the opposite end thereof a wing nut 8 is threaded and the shorter straight portions 1' and 2' of said plates also have holes registering in a transverse line, through which may be loosely mounted a screw 9 that has on one end a rounded head 9' and on the opposite end thereof a wing nut 10 is threaded.

The sizes given to the several portions of said plates may be varied in accordance with the sizes in transverse sections of the timbers to be joined.

In Figures 6 and 7 is shown an application of said clamp to the fastening of an upright member 11 and a bridge member or girder 12 of a scaffold, the upright member 11 being shown in transverse section within the space embraced between the intermediate U-shaped portions 1'' and 2'' of the two plates forming the clamp, which are joined in their straight portions 1 and 2 and 1' and 2' and held together by means of the screws 7 and 9, upon which are tightened the wing nuts 8 and 10 against the straight portions 1 and 1' of one plate. In this fastening the two vertical flat projections 3 and 4 are arranged in the same transverse vertical plane and upon the longer straight portions 1 and 2 of said plates or sections of the clamp, is made to rest an end of the bridge member or girder 12 which it is desired to fasten to the upright member 11, so that said bridge member or girder 12 will engage on one of its sides the adjacent side surface of the upright member 11 and cover thereby the adjacent ends of the U-shaped portions 1'' and 2'' of the sections of the clamp, and against the free side of the bridge member or girder 12 are made to rest the tapered heads of the two screws 5 and 6, which are threaded on through the threaded bores of the raised projections 3 and 4, by turning with the hands each wing head of such screws 5 and 6. By means of such an arrangement, the upright member 11 and the bridge member or girder 12 will be firmly held together.

In Fig. 8 is shown an application of two clamps exactly alike to the fastening of the extreme ends of two upright members 13 and 14. In this case, only the nuts 9 and 10 of the screws 7 and 9 of each clamp are tightened to hold together the two upright members 13 and 14 joined within the frame formed by the middle portions 1″ and 2″ of each clamp, the screws 5 and 6 of each clamp being left loose or without tightening for obvious reasons.

In order to prevent a slipping action, the inner faces of the two sections of the clamp, comprising the different portions of same, 1, 1′ and 1″, 2, 2′ and 2″, are made rough or without polishing.

What I claim is:—

A clamp for scaffolds comprising two plates extending in parallel and each having straight portions at its ends, one of which is longer than the other, and having at the middle a portion bent in a U-shape, and said U-shaped portions being oppositely located in regard to each other in order to leave an open space between them, said longer straight portions having raised projections oppositely located, screws loosely mounted through holes in the straight end portions of said plates and provided with tightening nuts, and screws mounted through threaded bores in projecting portions of said raised projections.

In witness whereof I affix my signature.

ALFONSO VILA.